US005968638A

United States Patent [19]

Brown et al.

[11] Patent Number: 5,968,638

[45] Date of Patent: Oct. 19, 1999

[54] HOLLOW FILAMENT WITH CRIMP FOR USE IN SPIRAL BINDING

[75] Inventors: James M. Brown, East Middlebury; Tom R. Huskey, Middlebury, both of Vt.; David J. Prawdzik, Andover, Mass.

[73] Assignee: Specialty Filaments, Inc., Burlington, Vt.

[21] Appl. No.: 08/905,422

[22] Filed: Aug. 4, 1997

[51] Int. Cl.[6] .......... B32B 7/02

[52] U.S. Cl. .......... 428/221; 428/36.9; 428/371; 428/398; 428/906

[58] Field of Search .......... 402/57; 428/34.6, 428/36.9, 371, 398, 906, 362, 221

[56] References Cited

U.S. PATENT DOCUMENTS

| | | | |
|---|---|---|---|
| 1,516,932 | 11/1924 | Staab | 402/57 |
| 2,194,023 | 3/1940 | Kranhold | 402/57 |
| 2,602,251 | 7/1952 | Friedman | 402/57 |
| 2,831,279 | 4/1958 | Esslinger | 402/57 |
| 3,826,290 | 7/1974 | Pfaffle | 140/92.7 |
| 3,928,698 | 12/1975 | Yamaguchi et al. | 428/172 |
| 4,129,675 | 12/1978 | Scott | 428/288 |
| 4,175,153 | 11/1979 | Dobo et al. | 428/398 |
| 4,384,022 | 5/1983 | Fowler | 428/296 |
| 4,519,629 | 5/1985 | Podosek | 281/25 A |
| 4,907,905 | 3/1990 | Fournier | 402/57 |
| 4,940,617 | 7/1990 | Baurmeister | 428/36.3 |
| 5,149,517 | 9/1992 | Fain et al. | 423/447.2 |
| 5,405,668 | 4/1995 | Sandt | 428/36.9 |
| 5,407,232 | 4/1995 | DesJarlais | 281/16 |
| 5,417,508 | 5/1995 | Friedman | 402/57 |
| 5,527,141 | 6/1996 | Malmstrom | 412/38 |
| 5,584,632 | 12/1996 | Stiles et al. | 412/39 |
| 5,585,182 | 12/1996 | Aneja et al. | 428/398 |
| 5,604,012 | 2/1997 | Okamoto et al. | 428/136 |
| 5,604,036 | 2/1997 | Price et al. | 428/376 |
| 5,791,802 | 8/1998 | Englum | 402/57 |
| 5,836,711 | 11/1998 | Stewart | 402/57 |

*Primary Examiner*—William Krynski
*Assistant Examiner*—Chris Cronin
*Attorney, Agent, or Firm*—Caesar, Rivise, Bernstein, Cohen & Pokotilow, Ltd.

[57] ABSTRACT

Multiple sheets spiral bound together as a unit by a continuous filament. The sheets have a plurality of closely spaced perforations aligned along an edge thereof. The filament is an elongated rod-like member having an outer surface and a centrally-located longitudinal axis. The filament is flexible and is disposed in spiral configuration through the perforations. The filament additionally comprises an inner surface defined by an internal elongate passage extending therethrough. The internal opening facilitates crimping of the inventive filament after it has been spiraled into a plurality of closely spaced perforations aligned along an edge of a stack of sheets. The internal opening in the filament also provides improved control over the outer dimension of the filament during manufacture.

25 Claims, 1 Drawing Sheet

HOLLOW FILAMENT WITH CRIMP FOR USE IN SPIRAL BINDING

BACKGROUND OF THE INVENTION

This invention relates generally to the field of binding of sheets, e.g., papers, books, calendars, notebooks, cookbooks, etc. More specifically, this invention relates to a continuous filament for spiral binding a stack of sheets together as a unit. The inventive filament is formed of an elongated flexible rod-like member having an internal opening extending therethrough. The internal opening facilitates crimping of the inventive filament after it has been spiraled into a plurality of closely spaced perforations aligned along an edge of a stack of sheets. The internal opening in the filament also provides improved control over the outer dimension of the filament during manufacture.

Conventional spiral bound books, e.g, cookbooks, calendars, notebooks, tablets, etc., have been on the market for many years. The spiral binding method has commonly been used in connection with school related products but also in many other applications. Typically, a suitable length of solid wire or solid filament of suitable plastic material, e.g., polyvinyl chloride (PVC), is spirally wound through a series of closely spaced perforations along an edge of a stack of sheets. After spirally winding, the free ends of the coiled length are bent to create closures at each end to prevent unwinding of the spiral binding during use of the bound book. In bending the ends of solid wire or filaments to create these closures several drawbacks are encountered. Often, solid wire and solid filaments are difficult to bend thus requiring considerable effort and possibly additional tooling. Also, over time, such solid wire and filaments have a tendency to return to their unbent state thus promoting unwinding of the spiral binding during use. Finally, maintaining close tolerance over the outer diameter of the wire or filament over its entire length is extremely important in fabricating a filament that is suitable for spiral binding. It is exceedingly difficult to maintain control over this dimension where the wire or filament being fabricated is solid. Therefore, there is a long-felt need for a filament for use in spiral binding having closures that can be created with minimal effort and that will retain their bent configuration over time. Also, there is a long-felt need for a filament for use in spiral binding wherein it is easy to control the outer diameter over the length of the entire filament during manufacture.

There have been suggestions in the prior art for providing a wire or filament for use in spiral bound books. Representative spiral bound books are disclosed in U.S. Pat. No. 5,407,232 (DesJarlais) and U.S. Pat. No. 4,519,629 (Podosek). These books employ solid wires or filaments that are subject to the aforementioned drawbacks or deficiencies.

Representative methods and machines for spiral binding are disclosed in U.S. Pat. No. 5,584,632 (Stiles et al.); U.S. Pat. No. 5,527,141 (Malmstrom); and, U.S. Pat. No. 3,826, 290 (Pfaffle).

Other patents generally disclosing hollow filaments and fibers include U.S. Pat. No. 5,585,182 (Aneja et al.); U.S. Pat. No. 4,940,617 (Baurmeister); U.S. Pat. No. 4,175,153 (Dobo et al.); U.S. Pat. No. 5,149,517 (Fain et al.); U.S. Pat. No. 4,384,022 (Fowler); U.S. Pat. No. 5,604,012 (Okamoto et al.); U.S. Pat. No. 5,604,036 (Price et al.); U.S. Pat. No. 4,129,675 (Scott); and, U.S. Pat. No. 5,405,668 (Sandt). None of the aforementioned patents describe use of a filament for spiral binding multiple sheet products nor any advantages achievable in such a spiral bound product.

OBJECTS OF THE INVENTION

Accordingly, it is a general object of this invention to provide a filament for use in spiral binding which overcomes the disadvantages of the prior art.

It is a further object of this invention to provide a filament for use in spiral binding which is inexpensive to manufacture.

It is a further object of this invention to provide a filament for use in spiral binding that is reliable in operation.

It is a further object of this invention to provide a filament for use in spiral binding that is lighter in weight than a conventional solid filament or wire.

It is a further object of this invention to provide a filament for use in spiral binding that is simple in construction.

It is a further object of this invention to provide a filament for use in spiral binding that is easier to crimp than a conventional solid filament or wire.

It is a further object of this invention to provide a filament for use in spiral binding wherein closures are easier to create than on conventional solid filaments or wires.

It is a further object of this invention to provide a filament for use in spiral binding wherein the bent closures reliably retain their bent configuration.

It is a further object of this invention to provide a filament for use in spiral binding that provides improved ability to control and keep constant the size of the diameter of the filament's outer surface over its entire length during manufacture.

It is a further object of this invention to provide a filament for use in spiral binding that provides a better surface finish than does a conventional solid filament.

It is a further object of this invention to provide a filament for use in spiral binding that provides an improved shine or surface finish than does a conventional solid filament.

It is a further object of this invention to provide a filament for use in spiral binding that provides less surface roughness than does a conventional solid filament.

It is a further object of this invention to provide a filament for use in spiral binding that shrinks less than a conventional solid filament.

SUMMARY OF THE INVENTION

These and other objects of this invention are achieved by providing multiple sheets spiral bound together as a unit by a continuous filament. The sheets have a plurality of closely spaced perforations aligned along an edge thereof. The filament is an elongated rod-like member having an outer surface and a centrally-located longitudinal axis. The filament is flexible and is disposed in spiral configuration through the perforations. The filament additionally comprising an inner surface defined by an internal elongate passage extending therethrough. The internal opening facilitates crimping of the ends of the inventive filament after it has been spiraled into a plurality of closely spaced perforations aligned along an edge of a stack of sheets. The internal opening in the filament also provides improved control over the outer dimension of the filament during manufacture.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
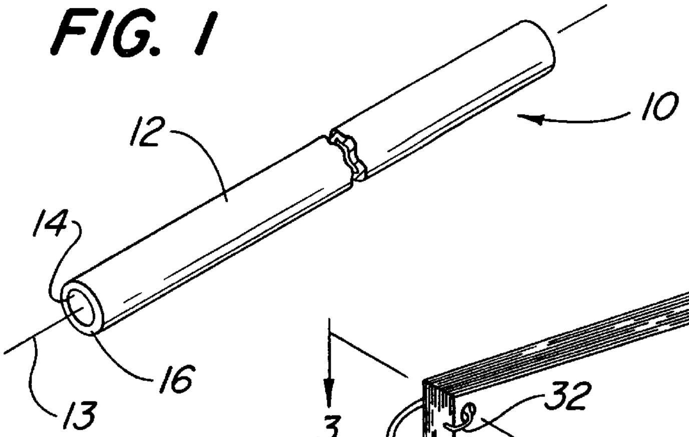
FIG. 1 is a fragmentary isometric view of a hollow filament of the present invention prior to being spirally disposed through and binding a plurality of sheets together.
Figure 2:
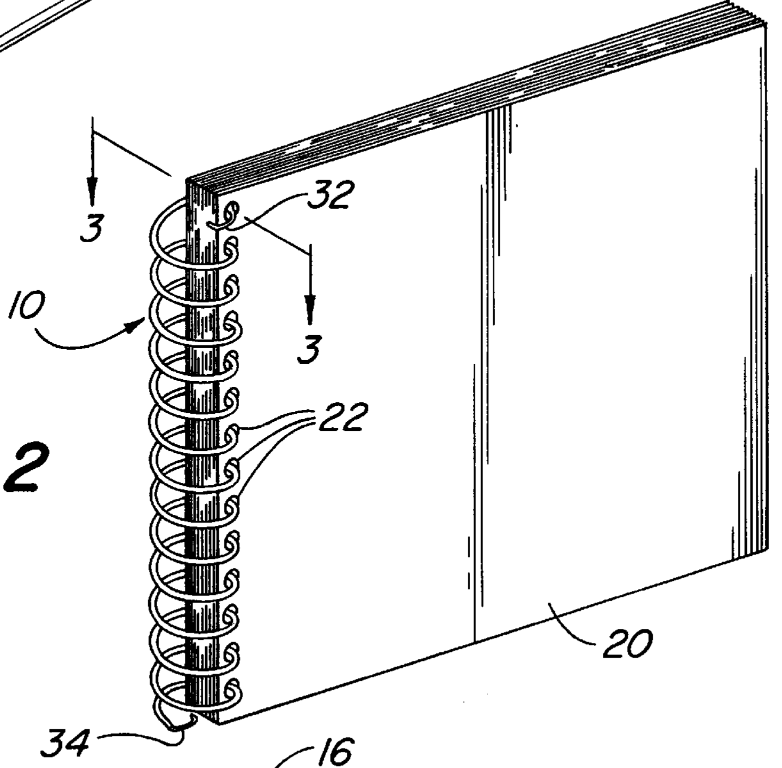
FIG. 2 is an isometric view of the hollow filament of the present invention spirally disposed through and binding a plurality of sheets together; and, FIG. 3 is an enlarged sectional view taken along line 3—3 of FIG. 2.
Figure 3:
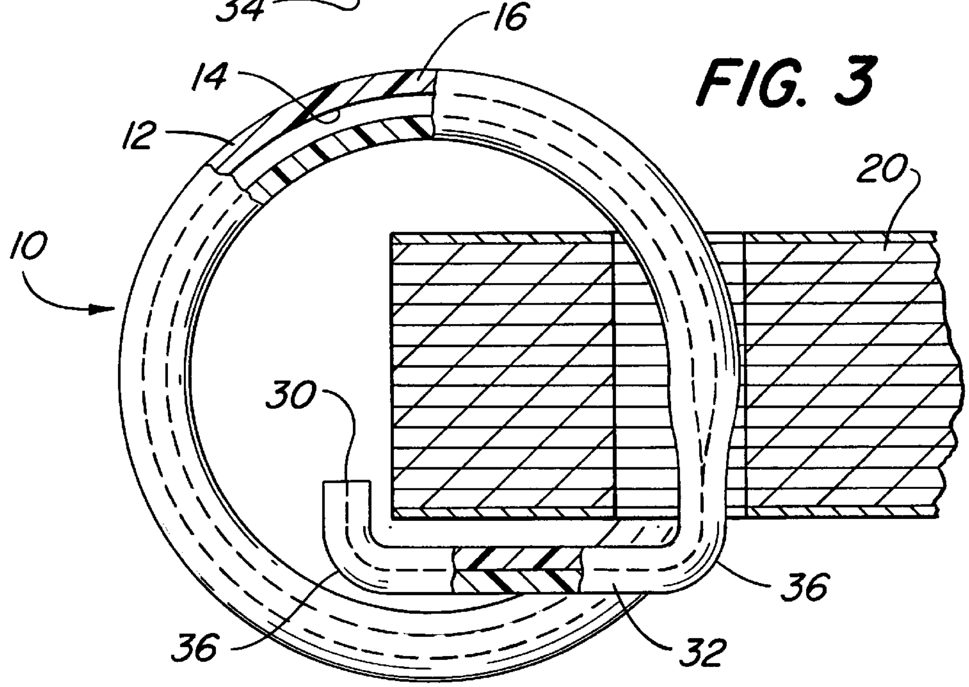

Referring now in greater detail to the various figures of the drawings wherein like reference numerals refer to like parts there is shown at 10 in FIGS. 1 through 3 the preferred embodiment of the hollow flexible filament of the present invention. The details of the filament 10 will be described later. Suffice it for now to say that the filament 10 of the present invention is arranged for spirally binding together a plurality of sheets along a common edge thereof.

As best shown in FIGS. 1 and 3, the filament 10 is an elongated rod-like member having an outer surface 12, a cylindrically-shaped inner surface 14 and a centrally-located longitudinal axis 13. The inner surface 14 is defined by an internal elongate passage extending through said filament 10. Preferably, the inner surface 14 is concentric with said longitudinal axis 13. The filament 10 may be formed of any suitable material, preferably a plastic material and most preferably polyvinyl chloride (PVC). Plastic filaments in accordance with this invention are usually formed by an extrusion process.

The filament 10 with its internal elongate passage may be formed by any suitable means, e.g., tube drawing using an internal mandrel or plug to create the internal elongate passage. The filament 10 may be provided in various sizes, the outer surface 12 ranging in diameter from approximately 0.040 inches to approximately 0.200 inches. The preferred range of diameter for the outer surface 12 is from approximately 0.060 inches to approximately 0.150 inches.

As best shown in FIG. 1, the inner surface 14 and the outer surface 12 define an annular wall 16 therebetween. The thickness of the annular wall 16 may range between approximately ten percent and forty percent of the diameter of the outer surface 12, the preferred thickness of the annular wall 16 being approximately thirty percent of the diameter of the outer surface 12.

As previously explained, maintaining the constancy of the outer surface diameter of the filament 10 over its entire length is extremely important in fabricating a filament that is suitable for spiral binding. Since the filament 10 of the present invention is provided with an elongate passage that extends along the length of the filament, by controlling the diameter of the filament's inner surface 14 during fabrication, one can more easily maintain the constancy of the diameter of the filament's outer surface 12. In the prior art solid wires and filaments it is exceedingly difficult to maintain the constancy of the dimension of the outer surface because they have no elongate passage and therefore no inner surface diameter to control.

Referring now to FIG. 2, the flexible filament 10 is shown therein spirally binding a stack of sheets 20 together as a unit. Each sheet 20 in the stack is provided with a plurality of closely spaced perforations 22 aligned along an edge thereof. The sheets 20 could be constructed of paper such that when spirally bound together using the filament 10 they form a notebook such as that used by students in school, a calendar, a book, etc. The bound stack of sheets 20 could also be formed of other materials, e.g., metals or plastics, such that when bound together provide other useful multi-sheet products.

Referring now to FIG. 3, the lead end 30 of the spirally configured filament 10 is shown. Adjacent the lead end 30, a lead closure segment 32 is formed by crimping and bending. Referring to FIG. 2, a corresponding tail closure segment 34, also formed by crimping and bending, is located at the opposite end of the spirally configured filament 10 and has the same configuration as the lead closure segment at 32. The lead and tail closure segments 32 and 34 are formed after the filament 10 has been spirally disposed through the stack of sheets 20 by use of any suitable machine for spiral binding.

As best shown in FIG. 3, to form the lead closure 32, suitable pressure is applied to the outer surface 12 of a segment of the filament 10 adjacent the lead end 30 by use of any suitable tool, e.g., a pliers or a crimping tool, thus causing the inner surface 14 to collapse upon itself and occupy the space previously defined as the elongate passage. After crimping, using a suitable tool, e.g., pliers, the segment is bent at one or more suitable locations 36 to deform the crimped segment from its spiral configuration and form the lead closure 32. The tail closure 34 is formed in a similar manner. The lead and tail closures 32 and 34 serve to prevent the spirally disposed filament 10 from unwinding out of the perforated holes of the stack of sheets 20 during use. Because the filament 10 is hollow rather than solid as are prior art filaments, crimping and bending require less force. Moreover, because the closures 32 and 34 are formed in the hollow filament 10, they have less of a tendency to return to their unbent state than do closures of the prior art which are formed at the ends of a solid filament.

Without further elaboration the foregoing will so fully illustrate our invention that others may, by applying current or future knowledge, adopt the same for use under various conditions of service.

We claim:

1. Multiple sheets spiral bound together as a unit by a continuous filament, said sheets having a plurality of closely spaced perforations aligned along an edge thereof, said filament being an elongated member having an outer surface and a centrally-located longitudinal axis, said filament being flexible and being disposed in spiral configuration through said perforations, said filament additionally comprising an inner surface defined by an internal elongate passage extending through said filament, said outer surface and inner surface defining an annular wall having a thickness of about ten percent to about forty percent of the diameter of the outer surface.

2. The filament of claim 1 wherein said filament comprises plastic.

3. The filament of claim 2 wherein said inner and outer surfaces are concentric.

4. The filament of claim 2 wherein the diameter of said outer surface of said filament is about 0.040 to about 0.200 inches.

5. The filament of claim 2 wherein the diameter of said outer surface of said filament is about 0.060 to about 0.150 inches.

6. The filament of claim 2 wherein said filament comprises polyvinyl chloride.

7. The filament of claim 2 additionally comprising a first end and a first segment located adjacent said first end, said first segment being crimped.

8. The filament of claim 7 additionally comprising a second end and a second segment located adjacent said second end, said second segment being crimped.

9. The filament of claim 8 wherein said crimped first and second segments each comprise at least one bend.

10. The filament of claim 7 wherein said crimped first segment comprises at least one bend.

11. The filament of claim 1 wherein the thickness of said annular wall is approximately thirty percent of the diameter of said outer surface.

12. The filament of claim 1 wherein said multiple sheets form a notebook.

13. The filament of claim 1 wherein said multiple sheets form a calendar.

14. The filament of claim 1 wherein said multiple sheets form a cookbook.

15. The filament of claim 1 wherein the thickness of said annular wall is about 0.004 to about 0.020 inches.

16. The filament of claim 1 wherein the thickness of said annular wall is about 0.016 to about 0.080 inches.

17. The filament of claim 1 wherein the thickness of said annular wall is about 0.006 to about 0.015 inches.

18. The filament of claim 1 wherein the thickness of said annular wall is about 0.024 to about 0.060 inches.

19. The filament of claim 1 wherein the thickness of said annular wall is about 0.012 to about 0.060 inches.

20. The filament of claim 1 wherein the thickness of said annular wall is about 0.018 to about 0.045 inches.

21. Multiple sheets spiral bound together as a unit by a continuous plastic filament, said sheets having a plurality of closely spaced perforations aligned along an edge thereof, said plastic filament being an elongated member having opposed first and second ends and first and second segments located adjacent said first and second ends, respectively, an outer surface and a centrally-located longitudinal axis, said plastic filament being flexible and being disposed in spiral configuration through said perforations, said filament additionally comprising an inner surface defined by an internal elongate passage extending through said filament from said first end to said second end, said first and second segments being crimped.

22. The filament of claim 21 wherein the inner surface at the first and second crimped segments is collapsed upon itself to occupy the space previously defined as the internal elongate passage.

23. The filament of claim 21 wherein the diameter of said outer surface of said filament is about 0.040 to about 0.200 inches.

24. The filament of claim 21 wherein said crimped first and second segments each comprise at least one bend.

25. The filament of claim 21 wherein the thickness of the filament between the outer and inner surfaces in uncrimped sections of said filament is about ten percent to about forty percent of the diameter of the outer surface in said uncrimped sections.

* * * * *